United States Patent
Frazier et al.

(10) Patent No.: US 8,352,911 B2
(45) Date of Patent: Jan. 8, 2013

(54) TECHNIQUES FOR CONSTRUCTING AND USING RUN-TIME JAVA ARCHIVES (JAR) FOR JAVA STORED PROCEDURES (JSPS)

(75) Inventors: John Douglas Frazier, Ramona, CA (US); Like Gao, San Diego, CA (US); Yu Long, San Diego, CA (US); Michael Leon Reed, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 1193 days.

(21) Appl. No.: 11/944,234

(22) Filed: Nov. 21, 2007

(65) Prior Publication Data
US 2009/0132997 A1    May 21, 2009

(51) Int. Cl.
G06F 9/44    (2006.01)
G06F 9/45    (2006.01)

(52) U.S. Cl. ............... 717/118; 717/148; 717/166
(58) Field of Classification Search ............ 707/101, 707/114, 200
See application file for complete search history.

(56) References Cited

U.S. PATENT DOCUMENTS

| | | | |
|---|---|---|---|
| 5,572,673 A * | 11/1996 | Shurts | 726/17 |
| 6,637,025 B1 * | 10/2003 | Beadle et al. | 717/148 |
| 6,766,353 B1 | 7/2004 | Lin et al. | |
| 7,093,243 B2 | 8/2006 | Bailey et al. | |
| 7,398,523 B2 * | 7/2008 | Martin et al. | 717/166 |
| 7,539,975 B2 * | 5/2009 | Atkin et al. | 717/118 |
| 7,665,080 B2 * | 2/2010 | Spotwood | 717/166 |
| 2003/0131320 A1 | 7/2003 | Kumhyr et al. | |
| 2003/0225795 A1 * | 12/2003 | Abdallah et al. | 707/200 |
| 2004/0073552 A1 | 4/2004 | Bailey et al. | |
| 2004/0194059 A1 * | 9/2004 | Akella et al. | 717/118 |
| 2004/0230950 A1 * | 11/2004 | Bedner et al. | 717/118 |
| 2005/0028152 A1 * | 2/2005 | Hays et al. | 717/166 |
| 2006/0004810 A1 * | 1/2006 | Atkin et al. | 707/101 |
| 2006/0112372 A1 | 5/2006 | Wang et al. | |
| 2007/0011667 A1 * | 1/2007 | Subbiah et al. | 717/148 |
| 2007/0168952 A1 * | 7/2007 | Lee et al. | 717/118 |
| 2007/0169041 A1 | 7/2007 | Kojima et al. | |
| 2008/0127141 A1 * | 5/2008 | Fulton | 717/148 |

OTHER PUBLICATIONS

Tamas Vilaghy, Redbooks, e-business Cookbook for z/OS vol. III: Java Development, 2002, pp. 41-56.*
Asheesh Gulati, Creating Installers for Java applications, EPFL Faculty I&C, Master of Science in Computer Science, 2006-2007, pp. 8-24.*
Oracle, Oracle Database Java Developer's Guide, 1999, part 5, Developing Java Stored Procedures.*

* cited by examiner

Primary Examiner — Thuy Dao
Assistant Examiner — Mongbao Nguyen
(74) Attorney, Agent, or Firm — Schwegman, Lundberg & Woessner, P.A.

(57) ABSTRACT

Techniques for constructing and using run-time JAVA Archive (JAR) files for JAVA Stored Procedures (JSPs) are provided. JSP methods referenced by an application via a plurality of different JAR files are extracted and packed into a single packed JAR file. When the application tries to execute a JSP, the attempt to process the JSP methods is redirected to a new JSP that calls the single packed JAR file.

9 Claims, 3 Drawing Sheets

TECHNIQUES FOR CONSTRUCTING AND USING RUN-TIME JAVA ARCHIVES (JAR) FOR JAVA STORED PROCEDURES (JSPS)

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright© 2007, Teradata, Inc. of Dayton, Ohio—All Rights Reserved.

BACKGROUND

JAVA technology continues to provide a useful mechanism for dynamically achieving programming goals. This run-time technology permits dynamic installation, configuration, and execution of software. This is particularly useful for software delivered remotely over a network connection, such as the Internet.

In addition to the usefulness of JAVA technology with respect to conventional Internet applications, many database providers have similarly recognized JAVA's benefits and usefulness particularly when delivering front-end services to a database over the Internet to end users. Thus, many databases now support JAVA.

One issue with the increasing pervasiveness of JAVA technology is that more complex JAVA Stored Procedures (JSPs) are being implemented in end-user applications that access enterprise databases. For large database or data warehouse installations, complex and voluminous usage of JSP methods within an application can quickly and adversely impact performance benchmarks for those database or data warehouse installations.

More particularly, existing database JAVA applications typically follow a standard for an American National Standards Institute (ANSI) Structure Query Language (SQL) that is optimized for JAVA (referred to as SQLJ) for purposes of using JAVA Archive (JAR) files to archive JAVA methods, which are then used by JSPs (JSP methods). Essentially, the JSP methods are packed into JAR files according to their functionalities.

For example, consider a database application using JSP methods to import, encrypt, and insert data files into a database. A database developer generally encrypts all data import related methods into one JAR file, all encryption related methods into a second JAR file, and all insertion methods into still a third JAR file. These JAR files are then installed in user databases for end-user applications to call. This is a generic approach and can permit the database developer to support and to service a variety of end-user applications in an easy and straight forward manner, via the three JAR files.

However, what seems ideal for support purposes can quickly become a performance issue during execution of the end-user applications that use these JAR files. The approach can result in multiple disk accesses when each end-user application executes. So, any particular application utilizing one method from each JAR file may encounter the following performance related issues: access to each of the JAR files can cause many disk page faults when the JAR files are large (this is not uncommon), usage of JSP methods from different JAR files means that multiple different disks requests are needed. These problems slow down processing of the JSPs within the application and degrades not only performance of a particular end-user application but also degrades performance for all users of the database.

Thus, improved mechanisms for constructing and using JAVA files associated with JSP methods are desirable.

SUMMARY

In various embodiments, techniques for constructing and using JAVA Archive (JAR) files for JAVA Stored Procedures (JSPs) are provided. More particularly, JSP methods being used by an application and detected and a plurality of JAR files are accessed for purposes of acquiring each of the JSP methods. Next, a new packed JAR file is assembled having each of the JSP methods. Finally, definitions for JSPs called in the application are replaced to call a new JSP that accesses each of the JSP methods via the new packed JAR file.

DETAILED DESCRIPTION

Figure 1:
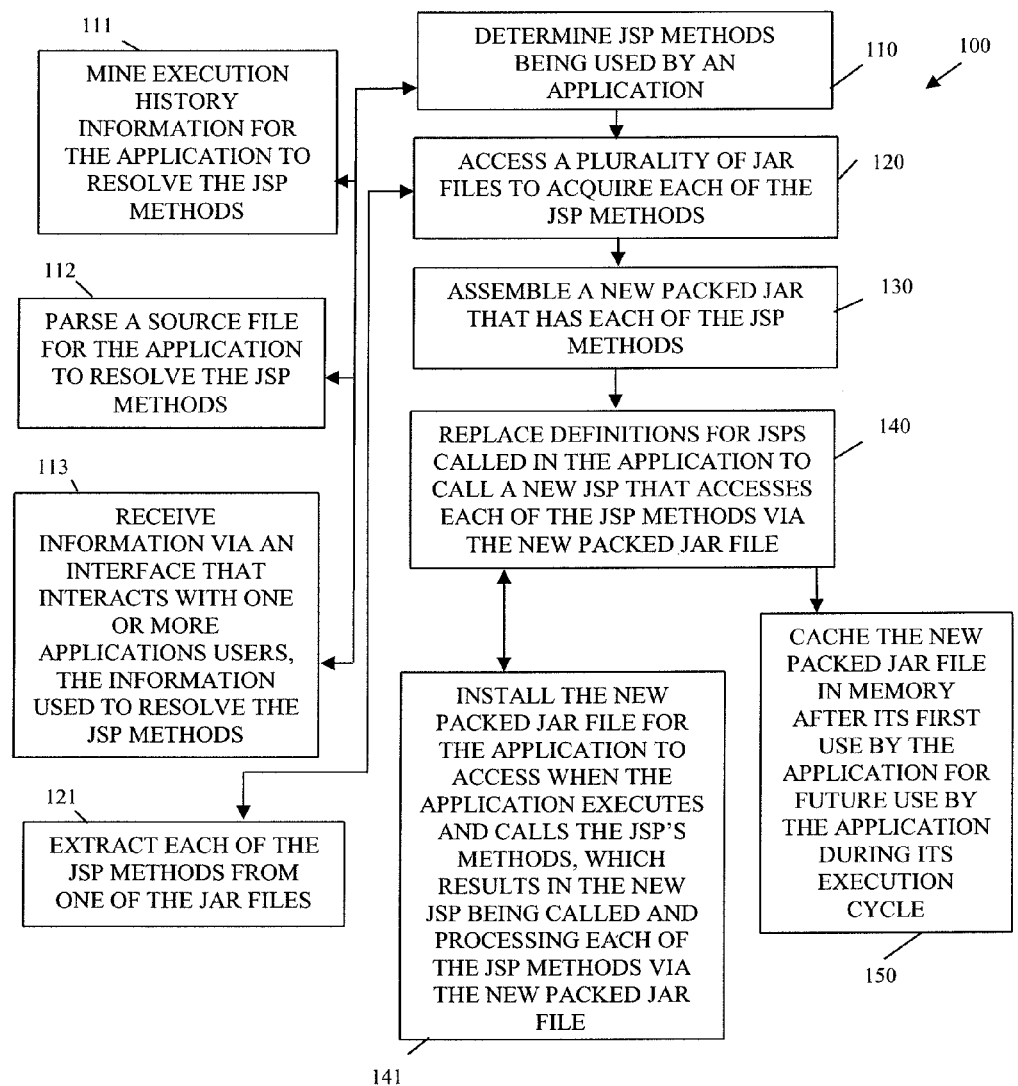
FIG. 1 is a diagram of a method for constructing and using JAVA Archive (JAR) files for Java Stored Procedures (JSPs), according to an example embodiment.

FIG. 1 is a diagram of a method 100 for constructing and using JAVA Archive (JAR) files for Java Stored Procedures (JSPs), according to an example embodiment. The method 100 (herein after referred to as "JAR/JSP service") is implemented in machine-accessible or computer-readable media as instructions and is executed by one or more machines (processing devices, computers, etc.). Moreover, the JAR/JSP service is accessible over a network. The network may be wired, wireless, or a combination of wired and wireless.

A "database" as used herein refers to a data warehouse. The warehouse can be a relational database, a file, a queue, a table, directory, or other sources of data or combinations of these things that are logically organized and cooperate via interfaces as a single accessible and updateable entity or resource.

One particular database that is used with the embodiments discussed herein and below is the Teradata® product, distributed by Teradata, Inc., of Dayton, Ohio.

It is however noted that although various illustrations may discuss using a database with the embodiments presented herein, the invention is not intended to be so limited. That is, the novel JAR file construction and usage with JSPs for an application can be utilized in application environments that are not database dependent.

Also, as used herein a "service" is a special type of resource that executes within a processing environment. So, the terms "service," "application," and "module" may be used synonymously and interchangeably herein and below and refer to software instructions that when executed by a machine, such as a computer, perform a variety of operations on that machine to change its state and in some cases produce output data.

It is within this initial context that the processing associated with the JAR/JSP service is now discussed in detail.

At 110, the JAR/JSP service determines JSP methods being used by an application. In an embodiment, the application is an end-user application that processes over a network to access a database that supports JAVA and includes JAR files for the end-user application to load and use during execution via that application's JSPs that make calls to the JSP methods. The JSP methods being used by the application can be resolved in a variety of manners.

For example, at 111, the JAR/JSP service mines execution history information for the application to resolve the JSP methods. In other words, when the application processes its processing history is tracked and recorded. That history is then mined to identify JSP method calls and this is used to resolve or determine the JSP methods that the application uses during its execution.

In another case, at 112, the JAR/JSP service parses a source file for the application to resolve the JSP methods being used by the application. Here, the source file of the application is scanned in an automated fashion to detect references to the JSP methods and the JSP methods are recorded. This approach can also augment the approach discussed above with reference to the processing at 111. Furthermore, this approach may also be beneficial and replace the approached discussed above with reference to the processing at 111 when a particular application has no prior application execution history at all (application may be running for the first time or may have little execution history may have run just a few times before, such that the execution history for it is unreliable).

In still another embodiment, at 113, the JAR/JSP service receives information via an interface that interacts with one or more application end-users. So, users can provide specific details on JSP methods or identify specific operations, such that the JSP methods can be resolved in an automated fashion. This approach, like the approach discussed at 112, can be used when the application has no prior or little reliable prior execution history. Further, this approach can be used in combination with the approaches discussed above at 111-112. In fact, any single or combination of the three approaches discussed above at 111-113 can be used by the JAR/JSP service to resolve and determine the JSP methods.

At 120, the JAR/JSP service accesses a plurality of JAR files to acquire each of the determined/resolved JSP methods that the application uses. Thus, at 121, the JAR/JSP service locates the proper JAR file for a given JSP method and extracts that JSP method from that JAR file. The extracted JSP methods are copied to a new packed JAR file (discussed below).

At 130, the JAR/JSP service assembles the new packed JAR file to include copies of each of the JSP methods that were acquired from the original JAR files that the application uses.

At 140, the JAR/JSP service replaces definitions for JSPs called in the application to call a new JSP. The new JSP accesses and acquires each of the JSP methods via the new packed JAR file. One technique for achieving this in JAVA is to write a replacement function for each JSP call in the applications that calls a specific JSP method. At runtime, the application picks the new JSP for each JSP call and that new JSP uses a single JAR file that being the new packed JAR file to locate each of the application's needed JSP methods.

According to an embodiment, at 141, the JAR/JSP service installs the new packed JAR file for the application to access when the application executes and calls its JSPs. This then results in the new JSP being called by the application when the application references its JSPs and each of the JSP methods are processed from the new packed JAR file.

In an embodiment, at the JAR/JSP service facilitates the new packed JAR file to be cached in memory after a first JSP method is accessed for a first time by the executing application. With the packed JAR file in memory, each subsequent attempt by the application to acquire a JSP method results in a single packed JAR file being accessed from memory.

This improves processing throughput even further with the packed JAR file. Moreover, the packed JAR file is smaller in size than the original JAR files, which include many JSP methods not even used by the application; so, with a much smaller file size there is less disk access required to retrieve the JSP methods of the application at runtime. Additionally, there is one JAR file being accessed (the packed JAR file), instead of what would conventionally be several independent JAR files. This also improves processing throughput of the application.

Figure 2:
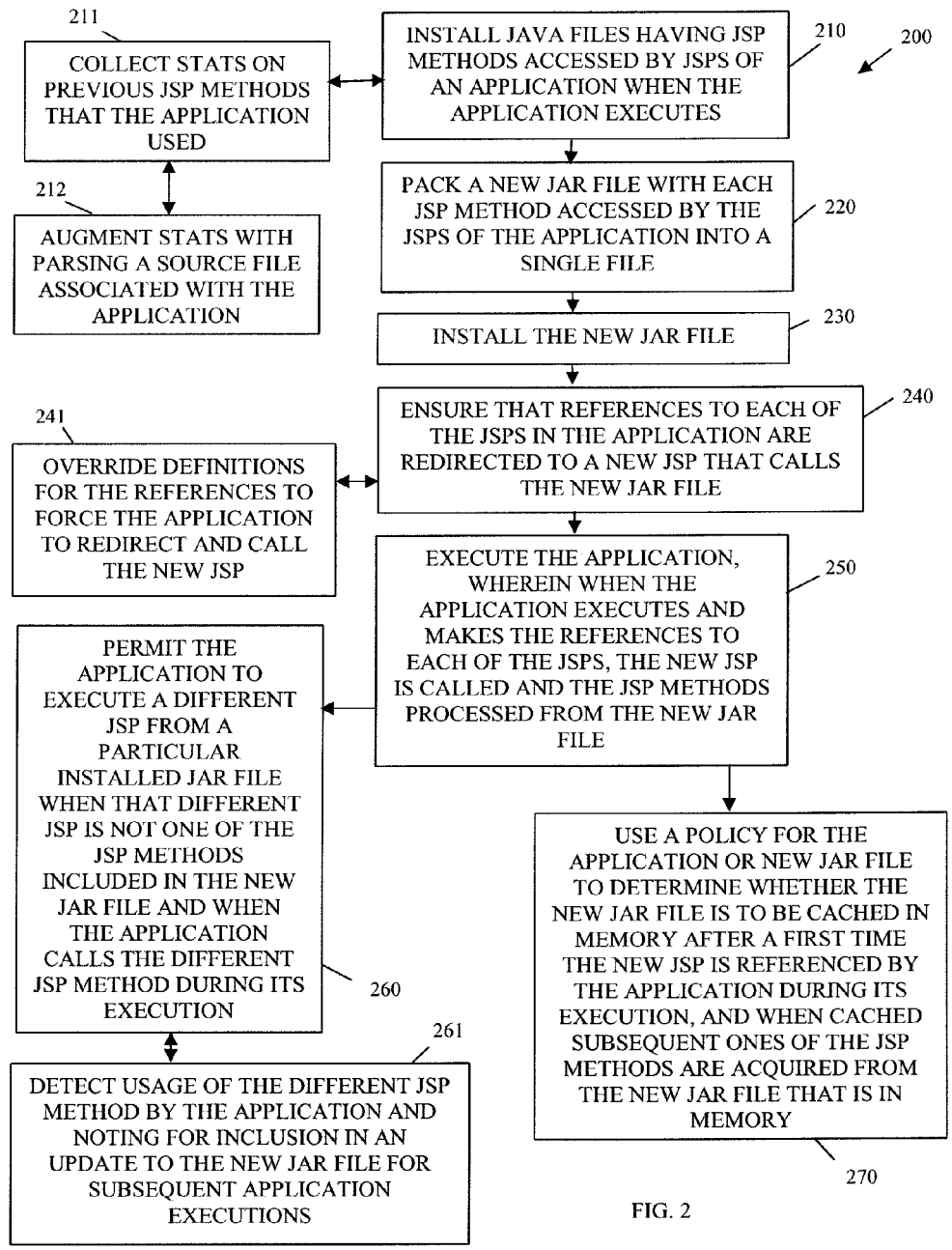
FIG. 2 is a diagram of another method for constructing and using JAR files for JSPs, according to an example embodiment.

FIG. 2 is a diagram of another method 200 for constructing and using JAR files for JSPs, according to an example embodiment. The method 200 (hereinafter referred to as "JAR packing service") is implemented in a machine-accessible and readable medium as instructions that when executed by a machine performs the processing depicted in FIG. 2. Moreover, JAR packing service is operational over a network, which may be wired, wireless, or a combination of wired and wireless.

The JAR packing service provides a different and in some cases enhanced perspective of the JAR/JSP service discussed above in detail with respect to the method 100 of the FIG. 1.

At 210, the JAR packing service installs JAR files that have JSP methods accessed by JSP calls of an application when the application executes. Again, a variety of approaches can be used for the JAR packing service to resolve what JSP methods are needed by the application. These were discussed above with reference to the method 100 of the FIG. 1.

Specifically in an embodiment, at 211, the JAR packing service collects statistics on previous JSP methods that application was known to use. This can be done by inspecting execution logs or histories for the application.

In still another case, at 212, the JAR packing service augments the processing at 211 by also parsing a source file for application to identify a number of the JSP methods.

At 220, the JAR packing service packs a new JAR file with each JSP method accessed by the JSP calls within the application. These JSP methods are packed or included into a single JAR file.

At 230, the JAR packing service installs the new JAR file within the execution processing environment that is to be used by the application.

At 240, the JAR packing service ensures that references or calls to the JSPs in the application are redirected to a new JSP call or reference that calls or uses the new JAR file having the needed JSP methods.

According to an embodiment, at 241, the JAR packing service achieves this by overriding definitions for the references to the JSPs to force the application to redirect and actually call the new JSP.

At 250, the JAR packing service executes or permits the application to execute, such that when the application executes and makes the references to its embedded JSPs, the new JSP is called and the JSP methods needed by the application are processed from the new and single packed JAR file.

In some cases, some JSP methods may have not been detected, in such a case, at 241, the JAR packing service permits the application to execute in a normal fashion. So, the application executes a different JSP that accesses a particular JAR file where that different JSP is not one of the JSP methods previously recognized by the JAR packing service and not one included in the new JAR file created by the JAR packing service.

When the processing at 241 occurs, and at 242, the JAR packing service detects the new usage or may later detect the usage with another inspection of the application's execution history. This new usage for the different JSP method is noted for inclusion in an update to the new JAR file for subsequent executions of the application. In this way, the missed JSP method is processed and is noted to be included in the new JAR file for subsequent executions.

According to an embodiment, at 250, the JAR packing service uses a policy for the application of the new JAR file to determine whether the new JAR file is to be cached in memory after a first time the new JSP is referenced by the application during its execution. When cached, the application acquires subsequent references to any of the JSP methods from the single new packed JAR file from memory.

For purposes of illustration and comprehension, an example is now discussed.

Consider an application that uses 4 JSPs to access four different JSP methods from 3 separate JAR files.

In a traditional situation, the definitions for these structures for an application may be defined as follows:

```
//step 1: the application install JAR_A, JAR_B, JAR_C first
call SQLJ.INSTALL_JAR('SJ!file_A.jar','JAR_A',0);
call SQLJ.INSTALL_JAR('SJ!file_B.jar','JAR_B',0);
call SQLJ.INSTALL_JAR('SJ!file_C.jar','JAR_C',0);
//step2: the application create JSP_A that uses method_A_1 in
JAR_A, create jsp_b, jsp_c
CREATE PROCEDURE JSP_A
    ( A INTEGER, OUT R INTEGER )
    LANGUAGE JAVA NO SQL
    PARAMETER STYLE JAVA
    EXTERNAL NAME 'JAR_A:myclass.method_A_1';
CREATE PROCEDURE JSP_B
    ( A INTEGER, OUT R INTEGER )
    LANGUAGE JAVA NO SQL
    PARAMETER STYLE JAVA
    EXTERNAL NAME 'JAR_B:myclass.method_B_1';
CREATE PROCEDURE JSP_C
    ( A INTEGER, OUT R INTEGER )
    LANGUAGE JAVA NO SQL
    PARAMETER STYLE JAVA
    EXTERNAL NAME 'JAR_C:myclass.method_C_1';
CREATE PROCEDURE JSP_A2
    ( A INTEGER, OUT R INTEGER )
    LANGUAGE JAVA NO SQL
    PARAMETER STYLE JAVA
    EXTERNAL NAME 'JAR_A:myclass.method_A_2',
The above 2 steps are just one time. When the application runs,
it calls JSP_A, JSP_B, JSP_C many times, just by their name.
It is assumed that the application doesn't call JSP_A2 at all.
This is run-time and most of time the application will do the
following things:
CALL JSP_A( 5, R );
...
CALL JSP_A( 100, R );
CALL JSP_B( -4, R );
CALL JSP_C( 30, R );
Traditionally,
CALL JSP_A( 5, R );  → find JSP_A's definition (as in step 2),
so it will try to call method_A_1 in JAR_A
CALL JSP_B( -4, R );  → find JSP_B's definition (as in step 2),
so it will try to call method_B_1 in JAR_B
CALL JSP_C( 30, R );  → find JSP_C's definition (as in step 2),
so it will try to call method_C_1 in JAR_C
            © Teradata, Inc., 2007
```

The JAR packing service detects that the application called JSP_A, JSP_B, and JSP_C many times. The processing depicted in the FIG. 2 for the JAR packing service then creates a single JAR as JAR_ABC that includes method_A__1, method_B__1, and method_C__1; and updates JSP_A, JSP_B, and JSP_C's definitions similar to this:

```
REPLACE PROCEDURE JSP_A
    ( A INTEGER, OUT R INTEGER )
    LANGUAGE JAVA NO SQL
    PARAMETER STYLE JAVA
    EXTERNAL NAME 'JAR_ABC:myclass.method_A_1';
REPLACE PROCEDURE JSP_B
    ( A INTEGER, OUT R INTEGER )
    LANGUAGE JAVA NO SQL
    PARAMETER STYLE JAVA
    EXTERNAL NAME 'JAR_ABC:myclass.method_B_1';
REPLACE PROCEDURE JSP_C
    ( A INTEGER, OUT R INTEGER )
    LANGUAGE JAVA NO SQL
    PARAMETER STYLE JAVA
    EXTERNAL NAME 'JAR_ABC:myclass.method_C_1';
No change JSP_A2 at all, and method_A_2 is still in JAR_A.
Note the application doesn't need any changes to do the call. Only
the definition changed so it will automatically find methods in
JAR_ABC:
CALL JSP_A( 5, R );
...
CALL JSP_A( 100, R );
CALL JSP_B( -4, R );
CALL JSP_C( 30, R );
            © Teradata, Inc. 2007
```

So, multiple JAR files having multiple JSP methods that require a lot of disk accesses and processing throughput are condensed into a single packed JAR file, which is essentially customized for the application. That is, the JAR packing service customizes a JAR file for an application based on its needed usage. If something is missed, the application still processes normally and finds its missing JSP method.

Only JSP methods needed by applications are packed into customized small JAR files, one packed JAR file per application. There is less disk access needed to read these packed JAR files. Moreover, in some cases, the JSP methods are pre-fetched into memory (cache). Less memory space is needed for caching because the packed JAR files are significantly smaller in size then conventional JAR files. Furthermore, memory is easier to manage with fewer entries. Additionally, the JAR packing service is entirely automated and transparent to developers and application users; it is fully automatic and transparent to users.

Figure 3:
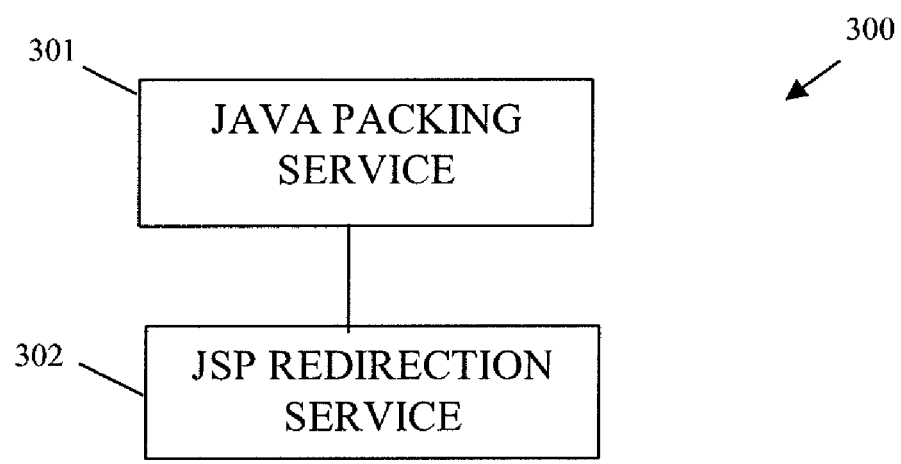
FIG. 3 is a diagram of a JAR file construction and usage system, according to an example embodiment.

FIG. 3 is a diagram of a JAR file construction and usage system 300, according to an example embodiment. The JAR file construction and usage system 300 is implemented in a machine-accessible and computer-readable medium as instructions that when executed by a machine performs a variety of processing, such as the processing discussed in detail above with reference to the methods 100 and 200 of the FIGS. 1 and 2, respectively.

The JAR file construction and usage system 300 includes JAR packing service 301 and a JSP redirection service 302. Each of these and their interactions with each other will now be discussed in detail.

The JAR packing service 301 is implemented within a machine-accessible and computer-readable medium and is processed on a machine as instructions. Example processing associated with the JAR packing service was discussed in detail above with reference to the method 100 of the FIG. 1 and the method 200 of the FIG. 2.

The JAR packing service 301 customizes a packed JAR file for an application with JSP methods referenced and used by that application. Originally, the application's JSP methods span multiple different JAR files.

The JAR packing service 301 determines the JSP methods for the application by inspecting execution histories and logs for the prior executions of the application for purposes of identifying each of the JSP methods.

In some cases, the JAR packing service 301 also augments the processing associated with inspecting execution histories of the application by parsing a source file associated with the application to further identify each of the JSP methods.

In yet another case, the JAR packing service 301 further receives some information from one or more application users during configuration that assists in identifying each of the JSP methods.

The JSP redirection service 302 is implemented in a machine-accessible and computer-readable medium as instructions that process on the machine or a different machine of the network. Again, an example processing scenario associated with the JSP redirection service 302 was presented above in detail with reference to the method 100 of the FIG. 1 and the method 200 of the FIG. 2.

The JSP redirection service 302 ensures that when the application makes references during its execution for specific JSPs that the application actually in fact grabs the needed JSP methods from the packed JAR file created by the JAR packing service 301.

In an embodiment, the JSP redirection service 302 redefines the JSPs referenced by the application to pick up a replacement JSP. The replacement JSP uses the packed JAR file to acquire the JSP methods desired by the application. Furthermore, the redefinition occurs within an execution space of the application.

In some cases, when the packed JAR file is first referenced during an execution cycle of the application, the packed JAR file is placed in cache for further usage by the application during the execution cycle.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R.§1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method residing in a non-transitory computer-readable storage medium for execution by a processor, comprising:
    determining, by the processor, Java Stored Procedure (JSP) methods being used by an application by using a combination of:
    mining execution history for the application to resolve the JSP methods,
    parsing a source file for the application to resolve the JSP methods,
    receiving information via an interface that interacts with one or more applications users, wherein the information is used to resolve the JSP methods, and wherein when the application processes the execution history is tracked, recorded, and then mined to resolve at least some of the JSP methods;
    accessing, by the processor, a plurality of JAVA Archive (JAR) files to acquire each of the JSP methods;
    extracting, by the processor, each of the JSP methods from one of the JAR files;
    assembling, by the processor, a new packed JAR file having each of the JSP methods;
    replacing, by the processor, definitions for JSPs called in the application to call a new JSP that accesses each of the JSP methods via the new packed JAR file;
    installing the new packed JAR file for the application to access when the application executes and calls the JSPs, which results in the new JSP being called and processing each of the JSP methods via the new packed JAR file; and
    caching, by the processor, the new packed JAR file in memory after its first use by the application for future use by the application during its execution cycle.

2. A machine-implemented method residing in a non-transitory computer-readable storage medium for execution by a processor, comprising:
    installing, by the processor, JAVA Archive (JAR) files having JAVA Stored Procedure (JSP) methods accessed by JSPs of an application when the application executes and resolving the JSP methods as a combination of:
    mining an execution history for the application,
    parsing a source code for the application, and
    receiving, via an interface, user instructions for some of the JSP methods for the application, and wherein when the application processes the execution history is tracked, recorded, and then mined to resolve at least some of the JSP methods,
    accessing, by the processor, a plurality of JAR files to acquire each of the JSP methods and each of the JSP methods extracted from a particular JAR file;
    packing, by the processor, a new JAR file with each JSP method accessed by the JSPs of the application into a single file;
    replacing, by the processor, definitions for JSPs called in the application to call a new JSP that accesses each of the JSP methods via the new packed JAR file;
    installing, by the processor, the new packed JAR file for the application to access when the application executes and calls the JSP methods, which results in the new JSP being called and processed for each of the JSP methods via the new packed JAR file;
    ensuring, by the processor, that references to the JSPs in the application are redirected to a new JSP that calls the new JAR file;
    executing, by the processor, the application, wherein when the application executes and makes the references to the JSPs, the new JSP is called and the JSP methods processed from the new JAR file; and
    caching, by the processor, the new packed JAR file in memory after its first use by the application for future use by the application during its execution cycle.

3. The method of claim 2 further comprising, using a policy for the application or the new JAR file to determine whether the new JAR file is to be cached in memory after a first time the new JSP is referenced by the application during its execution, and when cached subsequent ones of the JSP methods are acquired from the new JAR file that is in memory.

4. The method of claim 2 further comprising, permitting the application to execute a different JSP from a particular installed JAR file when that different JSP is not one of the JSP methods included in the new JAR file and when the application calls the different JSP method during its execution.

5. The method of claim 4 further comprising, detecting usage of the different JSP method by the application and noting that usage for inclusion in an update to the new JAR file when the application completes processing and for usage by the application from the updated new JAR file in subsequent executions of the application.

6. The method of claim 2, wherein ensuring further includes overriding definitions for the references to force the application during execution to be redirected and call the new JSP.

7. A machine-implemented system having a processor comprising:
- a machine having a JAVA Archive (JAR) packing service implemented in a non-transitory machine-accessible and machine-readable medium and to process on a machine; and
- the machine or a different machine having a JAVA Stored Procedure (JSP) redirection service implemented in a non-transitory machine-accessible and machine-readable medium and to process on the machine or the different machine;
- wherein the JAR packing service customizes a packed JAR file for an application with JSP methods referenced by the application, originally the JSP methods span several different JAR files, and wherein the JSP redirection service ensures that when the application makes references during its execution to JSPs for purposes of processing the JSP methods, the application actually grabs the JSP methods from the packed JAR file, the JSP methods resolved via a combination of:
  - mining execution histories for the application,
  - parsing source for the application,
  - receiving direction from a user via an interface for the application, and wherein when the application processes the execution histories are tracked, recorded, and then mined to resolve at least some of the JSP methods,
  - accessing a plurality of JAR files to acquire each of JSP methods and each of the JSP methods extracted from one of the JAR files,
  - assembling a new packed JAR having each of the JSP methods;
  - replacing definitions for JSPs called in the application to call a new JSP that accesses each of the JSP methods via the new packed JAR file;
  - installing the new packed JAR file for the application to access when the application executes and calls the JSPs, which results in the new JSP being called and processing each of the JSP methods via the new packed JAR file; and
  - caching the new packed JAR file in memory after its first use by the application for future use by the application during its execution cycle.

8. The system of claim 7, wherein the JSP redirection service redefines the JSPs referenced by the application to pick up a replacement JSP, wherein the replacement JSP uses the packed JAR file to acquire the JSP methods desired by the application, and wherein the redefinition occurs within an execution space of the application.

9. The system of claim 7, wherein when the packed JAR file is first referenced during an execution cycle of the application, the packed JAR file is placed in cache for further usage by the application during the execution cycle.

* * * * *